United States Patent [19]

Wood et al.

[11] Patent Number: 4,866,879
[45] Date of Patent: Sep. 19, 1989

[54] SEED TAPE PLANTING SYSTEM

[76] Inventors: Donald C. Wood; James D. Wood, both of 2810 Camino Tassajara, Danville, Calif. 94526

[21] Appl. No.: 225,535

[22] Filed: Jul. 28, 1988

Related U.S. Application Data

[60] Continuation of Ser. No. 35,786, Apr. 5, 1987, abandoned, which is a division of Ser. No. 708,444, Mar. 5, 1985, Pat. No. 4,694,606.

[51] Int. Cl.$^4$ .............................................. A01C 1/04
[52] U.S. Cl. ........................................ 47/56; 111/199
[58] Field of Search ................ 47/56, 73, 9; 111/1–4, 111/6, 7; 405/176

[56] References Cited

U.S. PATENT DOCUMENTS

| | | | |
|---|---|---|---|
| 3,098,320 | 7/1963 | Estkowski | 47/56 |
| 3,172,234 | 3/1965 | Eavis | 47/56 |
| 3,294,045 | 12/1966 | Kelley et al. | 47/56 |
| 3,331,532 | 7/1967 | Hori | 47/56 |
| 3,445,981 | 5/1969 | Hori | 47/56 |
| 4,080,755 | 3/1978 | Crosby | 47/56 |
| 4,353,183 | 10/1982 | Estkowski | 47/56 |

Primary Examiner—Danton D. DeMille
Attorney, Agent, or Firm—Bielen & Peterson

[57] ABSTRACT

A device for planting seed tape including a support structure which moves along the surface of the soil. The seed tape is advanced relative to the movement of the support structure and is cut repetitively at selected intervals. The severed seed tape is forced into the soil a predetermined distance. The seed tape employed with the device includes a relatively flat portion of material having first and second surfaces. The seed is held to the first surface of the portion of material. The seed tape further includes an opening through the same spaced from the seed held to the first surface of the portion of material.

1 Claim, 6 Drawing Sheets

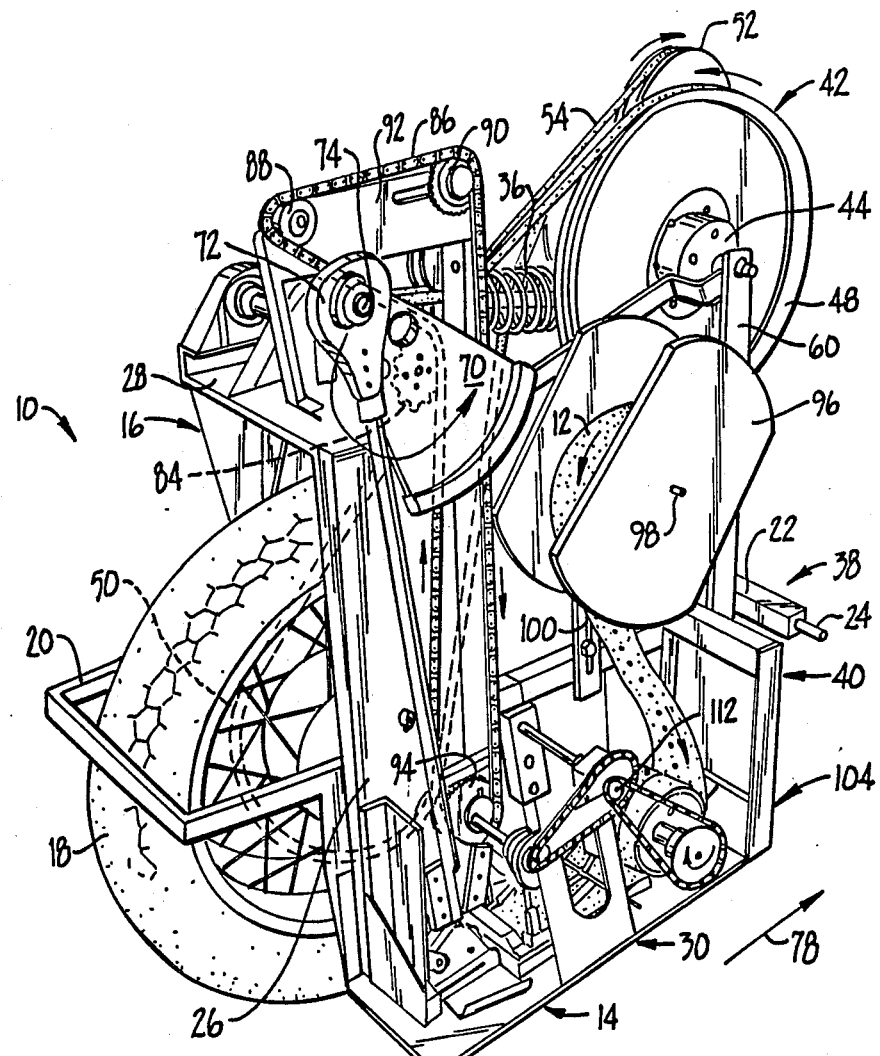
FIG.—1.
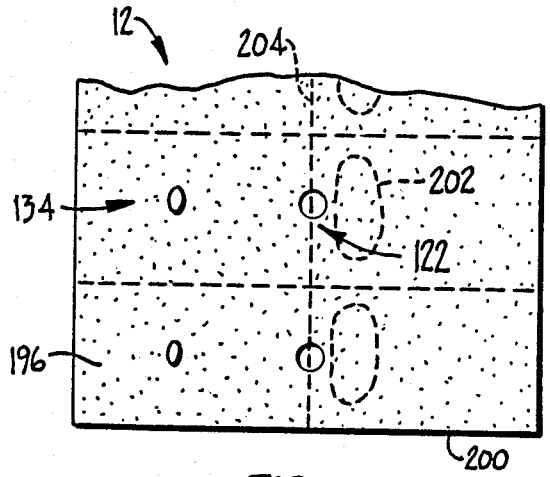
FIG.—2.
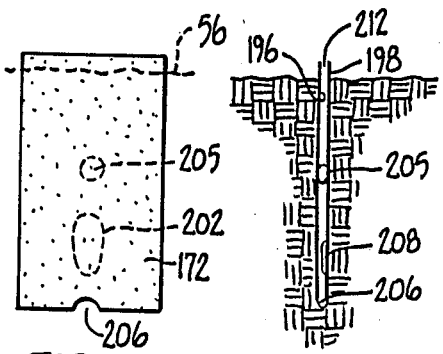
FIG.—3A.  FIG.—3B.

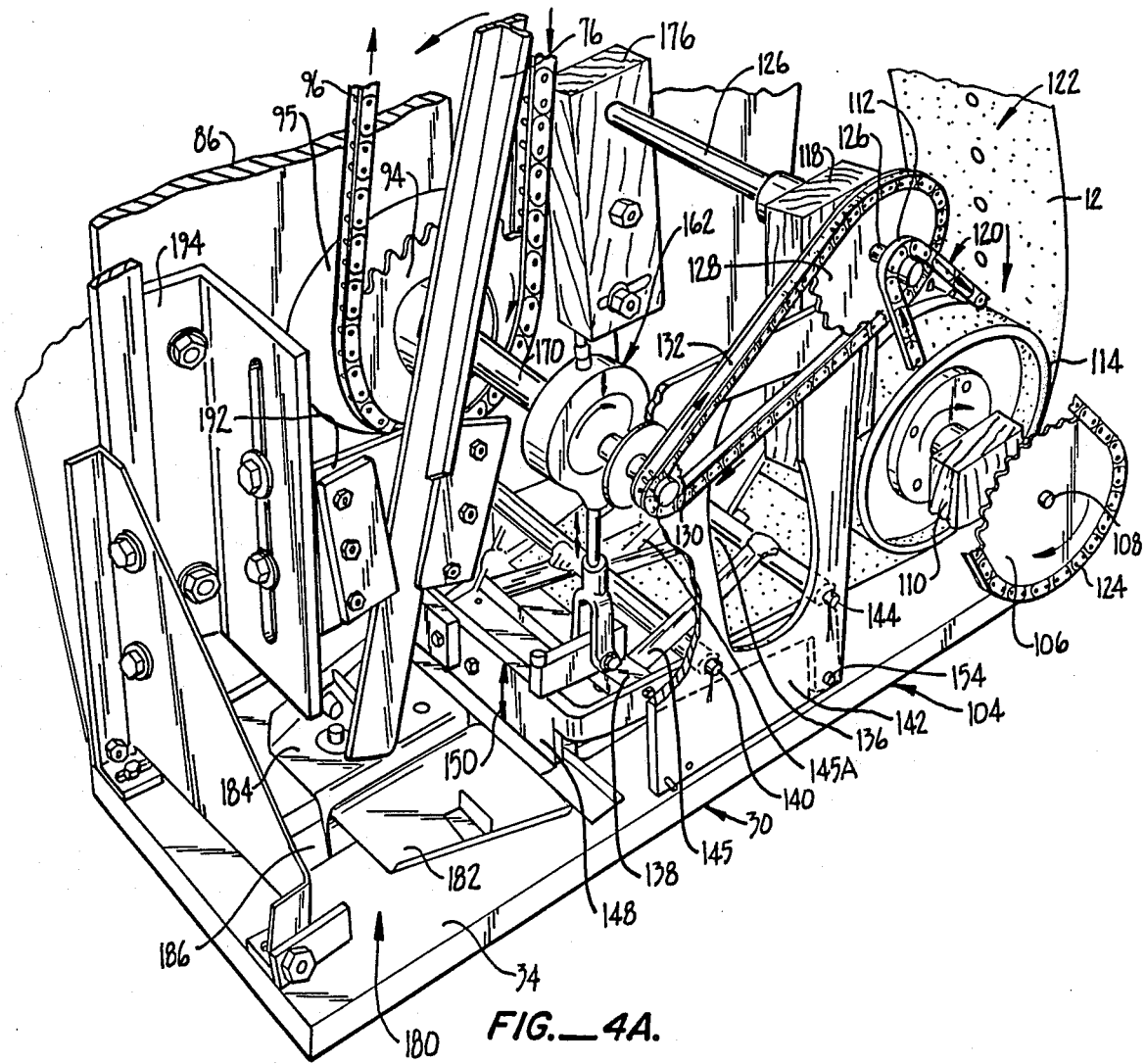
FIG._4A.
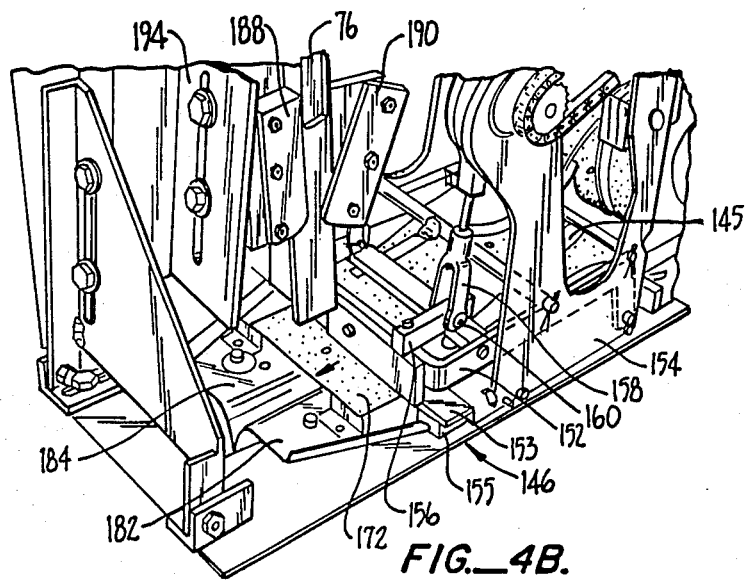
FIG._4B.

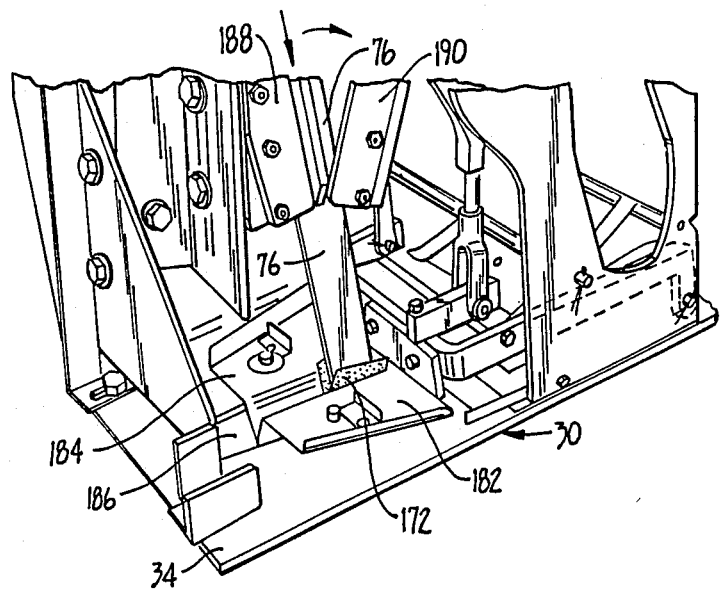
FIG._4C.
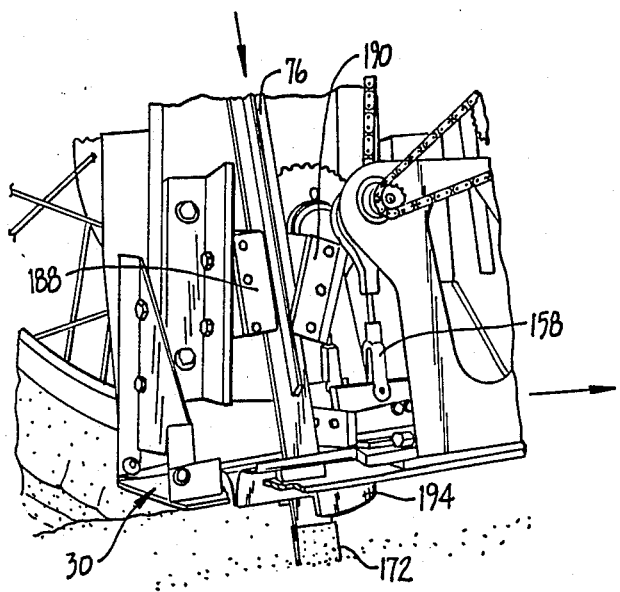
FIG._4D.
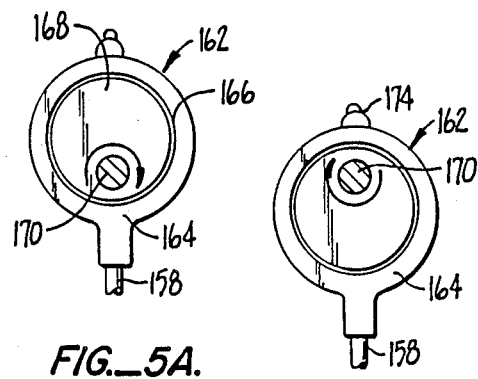
FIG._5A.
FIG._5B.

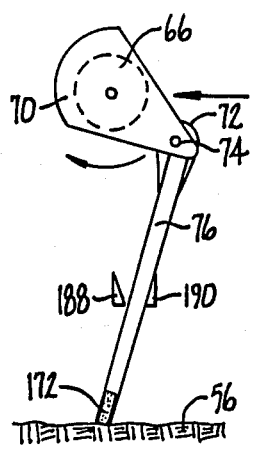
FIG._6A.
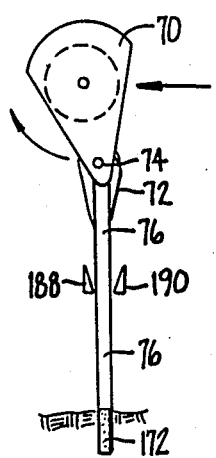
FIG._6B.
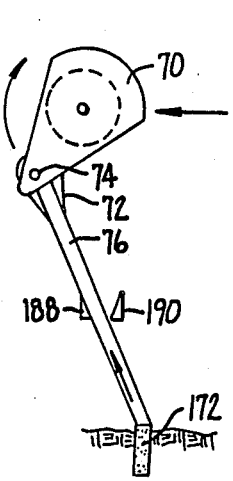
FIG._6C.
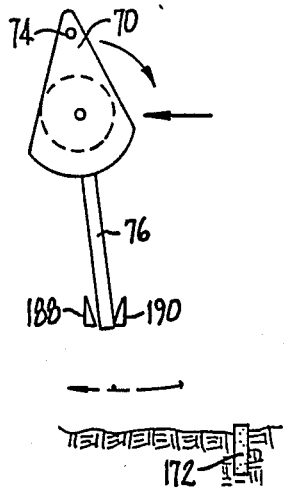
FIG._6D.
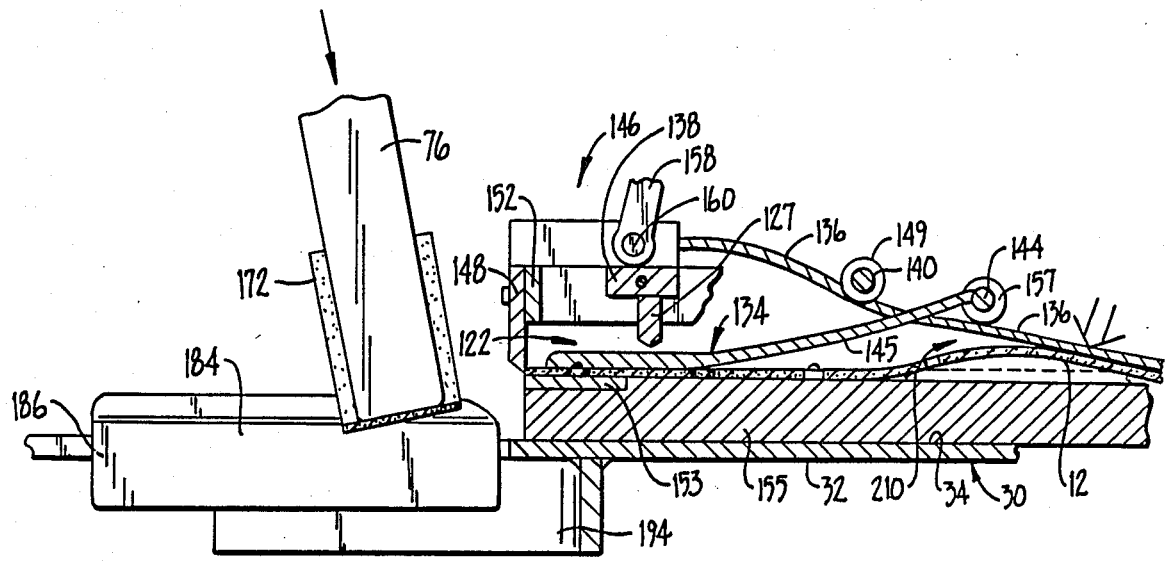
FIG._7.

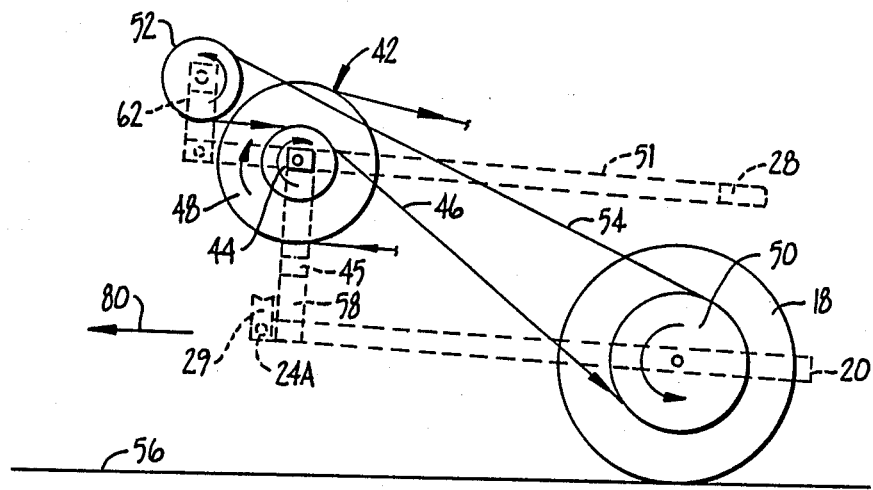
FIG._8A.
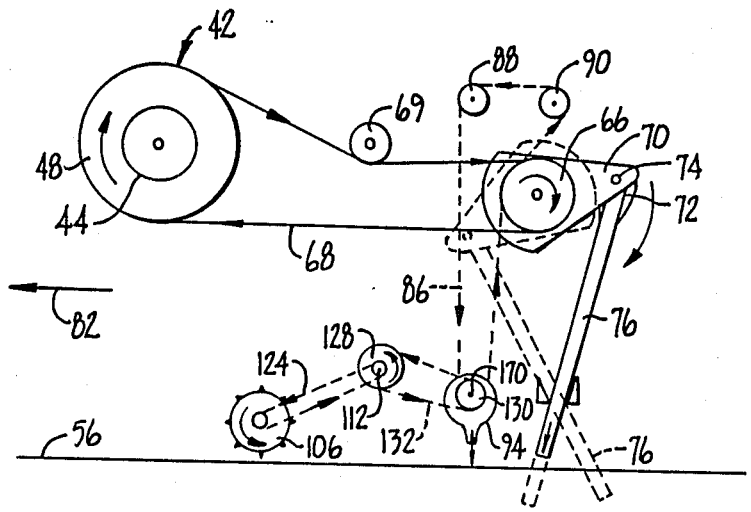
FIG._8B.

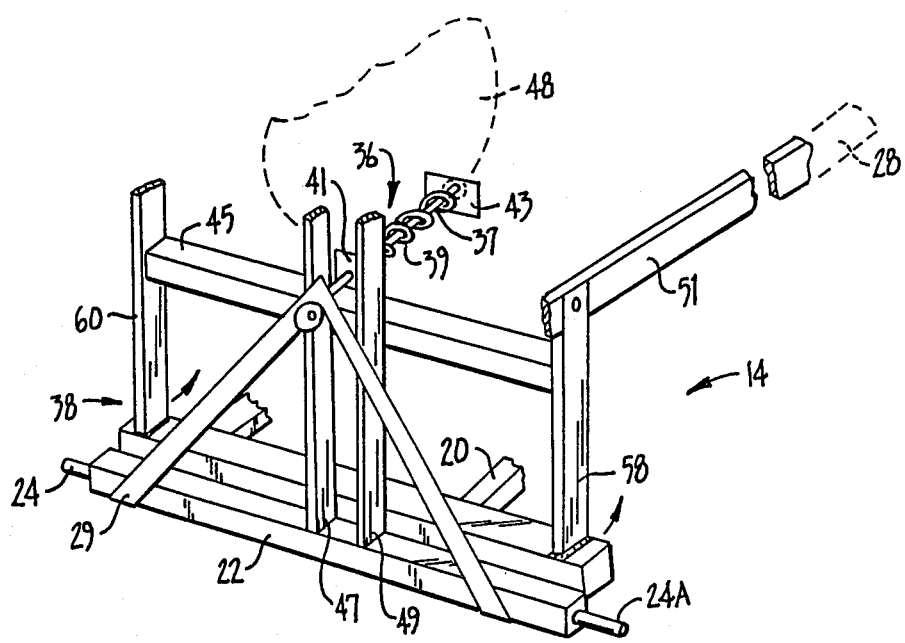
FIG._9.

SEED TAPE PLANTING SYSTEM

This is a continuation of application Ser. No. 035,786 filed Apr. 5, 1987 now abandoned which is a division of 708,444 field Mar. 5, 1985 now U.S. Pat. No. 4,694,606.

BACKGROUND OF THE INVENTION

The present invention relates to a novel device for planting a seed tape in soil and for a novel seed tape.

Seed tape has been employed in the past to aid in the planting of domesticated crops. Seed tape offers the advantage of accurately determining the spacing between seeds and alignment of multiple seeds in rows, a necessary element for automated growing and harvesting equipment. For example, U.S. Pat. No. 1,143,980 describes a seed tape which is laid horizontally in a furrow and held taunt against sinkage after watering of the same. French Pat. No. 1,102,190 and German Pat. No. 2,164,536 disclose seed tapes using fertilizer which are generally layed in a horizontal manner. U.S. Pat. Nos. 2,197,594, 2,571,491, and 2,812,618 show seed tapes which are laminated. The latter two patents teach the planting of laminated seed tapes in a partially vertical configuration.

U.S. Pat. No. 3,704,594 describes a ground cover sheet which employs a mesh covered by tissue paper in forming a multiplicity of cells for holding seeds. U.S. Pat. No. 3,445,981 describes a laminated seed tape which includes openings through the same for the purpose of advancing the tape through a manufacturing device. None of the prior art describes a device for planting seed tape in individual segments.

SUMMARY OF THE INVENTION

In accordance with the present invention a novel and useful device for planting seed tape in soil is provided.

The seed planting device includes a support structure and means for moving the support structure along the surface of the soil. The support structure may include a platform which is automotive or towable from a conventional tractor. The support structure may also include a base member which is supported a predetermined distance above the surface of the soil. The seed tape is advanced relative to the movement of the support structure, generally in a direction opposite to such movement. The means for advancing the seed tape may include a rotatable feed wheel and means for engaging the seed tape therewith. The seed tape is guided in relation to the support structure along the top of the base member of the support structure.

The device herein described also includes a cutter which repetitively severs section from the seed tape in conjunction with the advancement of the seed tape by the advancing means. In other words, the seed tape is periodically severed as the support structure moves along the surface of the soil. The cutter may include a knife supported by the support structure, a leg connected to the knife, and means for intermittently forcing the knife against the seed tape relative to the movement of the support structure.

Means is also included in the device of the present invention for forcing the severed seed tape section from the support structure and into the soil therebelow. The base member of the support structure possesses an undersurface adjacent the surface of the soil. Base member includes an opening through the same. An element is also employed which is capable of passing through the opening in the base member, contacting the severed seed tape section, and forcing the severed seed tape section through the opening in the base member and into the soil below the base member. Where the opening through the base member is an elongated opening, the element which forces the severed seed tape section through the same moves laterally along the dimension of elongation of the opening through the base member. Such an element may be constructed to include a crank rotatable about a pin and a rod having a proximal portion rotatable on a pin connected to the crank. The rod further has a distal end portion which is intended for passing through an opening in the base and for contacting the severed seed tape section. A shield may also extend from the undersurface of the base member in the predetermined position away from the base member opening. Such a shield would act as a guard against the soil, mud, rocks, and the like.

A seed tape may also be included in the present invention which includes a foldable flattened portion of material having a first surface and opposite second surface. An edge portion between the first and second surfaces defines a perimeter between the same. The seed is held to the first surface of the portion of material and an opening is formed through the portion of material at a selected distance from the seed. The material is foldable across the edge portion and through the opening in the portion of material. Thus, the folded portion of material and the opening would lie at the lowest point of the seed tape when it is placed in the soil. The fertilizer, and other chemical additives may be applied to the seed tape as desired.

It may be apparent that a novel and useful device for planting seed tape in soil has been described.

It is therefore an object of the present invention to provide a device for planting seed tape in the soil on which seeds have been attached to a continuous roll of hygroscopic paper before actual planting of the same.

It is another object of the present invention to provide a device for planting seed tape in soil which operates effectively and accurately in soils that are too wet for conventional planters.

It is yet another object of the present invention to provide a device for planting seed tape in soil which permits the planting of crops in a very timely manner to meet crop processing deadlines and market timing goals which increases the profit from the sale of crops grown thereby.

Another object of the present invention is to provide a device for planting a seed tape in soil which saves labor and expenses for seed by insuring a high Percentage of sprouting in the fields.

It is another object of the present invention to provide a device for planting seed tape in soil which greatly diminishes the need for crop thinning.

A further object of the present invention is to provide a device for planting seed tape into soil which protects seedlings from weed control chemicals incorporated into the upper portion, thereof, thus eliminating hand hoeing labor.

Another object of the present invention is to provide a device for planting seed tape in soil which effectively prevents "crusting over" which can be an impediment to the emergence of small seedlings.

The invention possesses other objects and advantages especially as concerns particular characteristics and features thereof which will become apparent as the specification continues.

BRIEF DESCRIPTION OF THE DRAWINGS

FIG. 1 is a top perspective view of the device of the present invention.

FIG. 2 is a broken top plan view of the seed tape of the present invention.

FIG. 3A is a side elevational view of the seed tape of the preset invention placed in soil.

FIG. 3B is an end elevational view of the seed tape of FIG. 3A placed in soil.

FIG. 4A is a broken top perspective of a portion of the mechanism of the device of the present invention.

FIG. 4B is a broken top perspective view showing advancement of the seed tape in the mechanism of the present invention.

FIG. 4C is a broken top perspective view showing the pushing of a severed seed tape section from the device of the present invention.

FIG. 4D is a broken perspective view showing the severed seed tape being pushed into the soil by the mechanism of the present invention.

FIG. 5A is a front broken elevational view of a portion of the cutting mechanism of the present invention.

FIG. 5B is a broken front elevational view of a portion of the cutting mechanism of the present invention.

FIGS. 6A–D depicts a progression of the stabbing mechanism of the present invention.

FIG. 7 is a sectional view showing portions of the cutting and stabbing mechanism of the present invention.

FIG. 8A is a schematic view of a portion of a rotational motion transfer mechanism of the present invention.

FIG. 8B is a schematic view showing a portion of the motion transfer mechanism of the present invention.

FIG. 9 is a end perspective view of the support structure of the present invention.

For a better understanding of the invention reference is made to the hereinafter described preferred embodiments of the present invention which should be taken in conjunction with the hereinabove described drawings.

DESCRIPTION OF THE PREFERRED EMBODIMENTS

Various aspects of the present invention will evolve from the following detailed description of the preferred embodiments thereof which should be referenced to the hereinabove described drawings The device as a whole is designated in the drawings by reference character 10. Device 10 is employed for planting a seed tape 12, shown partially in FIG. 2. Device 10 includes a support structure 14 which include a yoke 16 which rides on the wheel 18 via bracket or frame 20. Horizontal bar 22 connects to bracket 20 and includes bottom link 24 for a standard 3-point hitch. Another bottom link 24A on the opposite side of device 10 in FIG. 1 is found at the terminus of the horizontal bar 22, FIG. 8A. Yoke 16 includes a side portion 26 which extends downwardly from a top platform 28. A base member 30 connects to side portion 26 and includes an undersurface 32 and a top surface 34 Base member attaches to frame 20 by bracket 40, FIG. 4A.

With reference to FIG. 9, support structure 14 is illustrated in skeletal form. A brace 29 connects to bar 22 and adjustably engages a spring loaded member 36 having a bolt 37 surrounded by a spring 39 found between plates 41 and 43. Plate 41 is fixed to horizontal bar 45. Vertical members 47 and 49 connect to horizontal bar 22 and extend upwardly to help support torque generator 42, FIG. 1. Bar 51 connects to platform 28.

Bolt 37 of spring loaded member 36 forms the top link of a 3-point hitch 38 with links 24 and 24A. Hitch 38 may be of the type designated as SAE-J715 by the Society of Automotive Engineers. Wheel 18 is suspended to hitch 38 via member 36 to run lightly over ground surface 56.

Torque generator 42 includes a hydraulic portion 44 (shown schematically, FIG. 8A) as well as input pulley 46 and output pulley 48. Torque generator 42 may be a standard item such as model 2071018 manufactured by Eaton Corp., Eden, Prarire, Minn. Torque generator 42 is best shown in FIGS. 1, 8A and 8B. Hydraulic connection is made from hydraulic portion 44 to the tractor or other equipment pulling device 10 in a conventional manner (not shown). In this regard, wheel 18 includes a pulley 50. Idler pulley 52 is held to support structure 14 and tensions V-belt 54 which also contacts input pulley 46 of torque generator 42 and pulley 50 of wheel 18, FIG. 8A. Bracket 20 is depicted schematically in FIG. 8A and includes a vertical support 58 similar to vertical support 60 depicted in FIG. 1 attached to tool bar 40. Idler pulley 52 is held to support 51 by support 62, FIG. 8A. It should be noted that the depiction shown in FIG. 1 is the opposite side of the device as is shown in FIG. 8A of the drawings Turning to FIG. 8B the rotational transmission of device 10 is depicted from the side opposite that shown in FIG. 1. Torque generator 42 includes an output pulley 48 which connects to pulley 66 via V-belt 68 which is tensioned by idler pulley 69. Fly wheel 70 turns with pulley 66. A crank 72 rotates on a bearing mounted pin 74 which is connected to fly wheel 70. Rod or pitman arm 76 extends downwardly from crank 72 such that rod 76 "walks" with the motion of device 10, which will be discussed in detail as the specification continues. It should be noted, however, that rod 76 is depicted in phantom in FIG. 8B in one of its many positions. Directional arrows 78 of FIG.1 and 80 and 82 of FIGS. 8A and 8B show the intended motion of device 10 along ground surface 56.

Pulley 66 includes a sprocket 84, FIG. 1, which engages a chain 86. Idler sprockets 88 and 90 rotate during operation and are supported by mounting bracket 92 which is held to platform 28 of yoke 16. Another sprocket 94 is rotationally held to side plate 95 which is fastened to base 30 below sprockets 88 and 90, FIG. 1. Again, FIG. 8B depicts the relation between sprockets 88, 90 and 94 with chain 86.

A seed tape spool 96 rotates on a pin 98 which is held to a strap 100 fixed to bracket 20, FIG. 1. The seed tape 12 is rolled about spool 96 and is advanced by means 104 relative to the movement of support structure 14 along ground surface 56, heretofore described.

Turning to FIG. 4A–D, the operation of means 104 is most fully illustrated. Means 104 includes a sprocket 106 which turns shaft 108. Shaft 108 is held by wooden bearing 110 and another (not shown) which rest on top surface 34 of base member 30. Seed tape feed wheel 114 rotates with shaft 108 and includes a the plurality of openings 122 found in seed tape 12. Sprocket 112 and sprocket 106 are turned by chain 124. In addition, sprocket 112 lies along shaft 126 which is turned by sprocket 128. Shaft 126 is held in wooden bearings 118 and 176, attached to side plates 95 and 142. Sprocket 130 and sprocket 128 turn with chain 132 which is linked to sprocket 94, which will be described hereinafter.

Seed tape 12 includes a plurality of seeds 134 held thereupon by any known means such as gluing, taping, impregnating or the like. Finger 136 held to bar 140 adjusts the slack of seed tape 12 which passes around wheel 114. Rod 140 spans side plates 142 and 95. Seed tape 12 passes beneath rod 140 and another rod 144 which is supported in the same manner as rod 140. Cutter 146 is intended for contacting the top of seed tape 12. Means 104 advances seed tape 12 relative to the motion of support structure 14 over ground surface 56 and according to the sizing of the sprockets, including sprockets 106, 128, 130, 84 and 94.

A cutter 146 is also illustrated in FIGS. 4A-D and FIG. 7. Cutter 146 includes a blade 148 which moves according to directional arrow 150, FIG. 4A. Blade 148 is fixed to rim 152 by any known fastening means. Hinge pin 154 rotates rim 152 and attached blade 148 downwardly and upwardly. A pair of bars such as bar 156 fastens to rim 152 and connected blade 148, FIGS. 4B and 7. A fork 158 rotatably connects to pin 160 through bar 156.

With references to FIGS. 5A and 5B, a shear drive 162 is depicted. Upper part of fork 158 fixes to a circular link 164. Link 164 possesses a cam surface 166 around which cam follower 168 travels. Shaft 170 extends transversely to sprocket 94 and to sprocket 130. Thus, means 104 for advancing seed tape 12 derives power from wheel 18, FIGS. 8A and 8B. As illustrated, circular link 164 is in the "up" position in FIG. 5A and in the "down" position in FIG. 5B. The down position, FIG. 5B, corresponds to the position shown in FIG. 4B where a single strip or segment 172 of seed tape 12 has been produced by cutter 146. Finger 136 attaches to and rotates with cylindrical collar 149 which lies over shaft 140. Likewise fingers 145 and 145A attach to cylindrical collar 157 surrounding shaft 144 FIGS. 1 and 7.

The device 10 also includes means 180 for forcing the severed seed tape 172 from the support structure 14 and into the soil below ground surface 56 shown in FIGS. 4C and 4D. Rod 78 may be deemed to stab strip 172 downwardly. A pair of guides 182 and 184 extend through opening 186 in base member 30. Plates 188 and 190 guide rod 76 in a "walking" motion. Plates 188 and 190 shown in FIGS. 4C and 4D are connected to an angle member 192 which is adjustably fastened to angle member 194 FIG. 4A. Angle member 194 is fixed to side portion 26 of yoke 16. Thus, the stabbing rod 76 may be adjusted to different seed spacings. As shown in FIGS. 4C and 4D seed tape strip is pushed through opening 186 and into soil beneath ground surface 56. A mud guard 195 prevents soil from entering opening 186 from below base member 30.

Looking at FIG. 6A-D, it may be observed that the combined action of the fly wheel 70, crank 72, and rod 76 will plant seed tape strip 172 as shown. Rod 176 is T-shaped to facilitate guiding by plates 188 and 190 heretofore described.

Returning to FIG. 2, 3A and 3B the structure of seed tape 12 is most clearly depicted. Seed tape 12 consists of a hygroscopic degradable paper which is generally flat. Seed tape 12 includes a first surface 196 and a second surface 198. An edge portion 200 separates first and second surfaces 196 and 198. Chemical additive such as a fertilizer patch 202 may also be included on seed tape 12. Seed tape 12 will be folded along fold line 204 in FIG. 2. Turning to FIGS. 3A and 3B it may be seen that a strip 172 of seed tape 12 has been planted below surface 56. Seed 205 lies a selected distance below surface 56, opening 206 is at the very bottom of strip 172. Chemical additive portion 202 may lie between hole 206 and seed 205.

In operation, the user moves device 10 along surface 56 of the soil to be seeded. Spacing of the seed tape sections such as section 172 is adjusted by the ratio of drive pulleys 50, 46, 48 and 66. The rotational action of flywheel 70 produces a walking action in rod 76, as shown in FIGS. 6A-6D. The tip of rod 76 remains in the soil for a predetermined period of time which is related to the spacing of seed strips 172 along the ground. The walking motion of rod 76 is adjusted by moving plates 188 and 190 upwardly or downwardly in relation to the pivot of fly wheel 70. Dragging of the tip of rod 76 through the soil is eliminated by the adjustment. Folded seed section or strip 172 protects the tip of rod 76 from contact with the soil.

Seep tape 12 is systematically advanced by means 104. Seed tape 12 uncoils from feed roll 96 around seed tape feed wheel 114. Cogs 120 engage plurality of openings 122 during this feeding operation. Seed tape 12 is then guided into cutter 146, passing under spring steel fingers 136, 145 and 145A. As upper cutter assembly 147 (comprising rim 152, blade 148, and fork 158) begins the downward cutting stroke fingers 145 and 145A are contacted by elements 127 and one, not shown, depending from bar 138. Fingers 145 and 145A subsequently pinch seed tape 12 against stationary cutting blade 153 causing the leading end of seed tape 12 to pause.

Seed tape 12 forms a buckle 210, FIG. 7, since the remaining portion of seed tape 12 advances when the leading edge of the same is pinched. As upper cutter assembly 147 begins the upward stroke, fingers 145 and 145A are released and finger 136 is contacted by bar 138. The leading end of seed tape 12 is subsequently released and allowed to pass between blades 148 and 153. The upward motion of the bar 138 against finger 136 pivoting about rod 140 flattens buckle 210 (shown in phantom on FIG. 7.).

After seed segment 172 is severed from seed tape 12, rod 76 contacts segment 172 and forces or stabs segment 172 through guides 182 and 184. Segment 172 is folded in half and inserted into soil 56, leaving a portion of segment 172 above soil surface 56, FIG. 3B.

A seed 205, prepositioned a precise distance from fold line 204 on segment 172, will consequently, remain a precise distance from soil surface 56 when inserted, FIG. 3A and 3B. A portion of segment 172 will extend above soil surface 56 providing a channel 212 between folded first surface 196 so that soil "crusting" will not prevent seedling emergence. Opening 206 permits the root system of the seedling emerging from seed 205 to grow straight down into the soil Such root system avoids contacting soil 56 until passing through opening 206.

While in the foregoing embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A seed tape planting system for planting seed in soil, comprising:

a. a plurality of strips formed from the parallel severing of a single tape, each strip including an elongated unit of foldable flat material having a first flat surface and an opposite second flat surface, said elongated unit further having a pair of spaced elongated sides and a pair of spaced ends;

an indexing opening extending through said elongated unit of foldable flat material from said first flat surface to said second flat surface thereof for advancing and locating said elongated unit, said indexing opening being centrally located within said elongated unit, between said pairs of sides and pairs of spaced ends of said elongated unit of foldable flat material; and means for holding a seed to said first surface of said elongated unit of foldable flat material, said seed being located between said centrally located opening and one of said pair of spaced ends of said elongated unit of foldable flat material; and b. a forcing element for forcing said elongated unit into the soil, means placing said first flat surface of said elongated unit of foldable flat material adjacent said forcing element, reciprocating motion means for forcing said forcing element downwardly and placing said strip opening below the surface of the soil.

* * * * *